United States Patent Office 3,202,710
Patented Aug. 24, 1965

3,202,710
1-(2-CYCLOALKYL-2-DILOWER ALKYLAMINO-ETHYL) GUANIDINES
James W. Bolger, Canoga Park, Calif., assignor to Rexall Drug and Chemical Company, Los Angeles, Calif., a corporation of Delaware
No Drawing. Filed Dec. 6, 1962, Ser. No. 242,596
3 Claims. (Cl. 260—564)

This invention relates to compositions of matter classified in the art of chemistry as substituted guanidines. This application is a continuation-in-part of my copending application Serial No. 120,500, filed June 29, 1961, entitled "Aliphatic Nitrogen Compound," and now abandoned.

The invention sought to be patented resides in the concept of a chemical compound having the following structural formula:

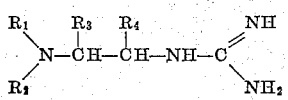

wherein $R_1$ and $R_2$, which may be the same or different, are lower alkyl and $R_3$ and $R_4$ are members selected from the group consisting of hydrogen, lower alkyl and cycloalkyl containing 4 to 10 carbon atoms, for example cylobutyl, cyclopentyl, methylcyclopentyl, cyclohexyl, ethylcyclohexyl, cycloheptyl, cyclooctyl, cyclononyl, cyclodecyl, ethylcycloheptyl and the like, wherein at least one of said $R_3$ and $R_4$ substituents is selected from the group consisting of lower alkyl and cycloalkyl containing 4 to 10 carbon atoms.

As used in the specification and in the claims the term "lower alkyl" embraces straight and branched chain alkyl groups containing from one to six carbon atoms.

The tangible embodiments of this invention possess the inherent general physical characteristics of being, in the form of their acid addition salts, white crystalline solids.

The tangible embodiments of this invention possess the inherent applied use characteristics of having significant pharmacological activity as anti-hypertensive agents as determined by recognized and accepted pharmacological test procedures. These compounds block the pressor effect of amphetamine when given orally to dogs at doses ranging from 3 to 12 mg./kg. body weight per day. That the embodiments of this invention possess such activity is suprising and highly unexpected in view of Mull et al. (J. Org. Chem., 25: 1953 (1960)) who prepared N,N-dialkylaminoalkylguanidines having structures similar to the above described formula except that both $R_3$ and $R_4$ were hydrogen and reported that such compounds were pharmacologically inactive.

The manner and process of making and using the invention will now be generally described so as to enable a person skilled in the art of the chemistry to make and use the same as follows:

The preparation of the substituted guanidines of this invention is illustrated in the following reaction sequence:

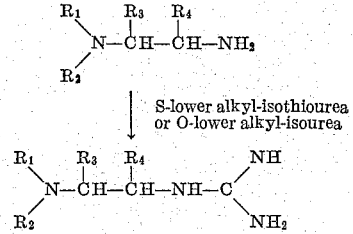

wherein $R_1$, $R_2$, $R_3$ and $R_4$ are as described above.

The substituted diamine starting materials are well-known compounds in the art of chemistry and are commercially obtainable or may be prepared by any one of several conventional methods.

One such method which is applicable to the preparation of starting materials where $R_4$ is H is illustrated by the following reaction sequence:

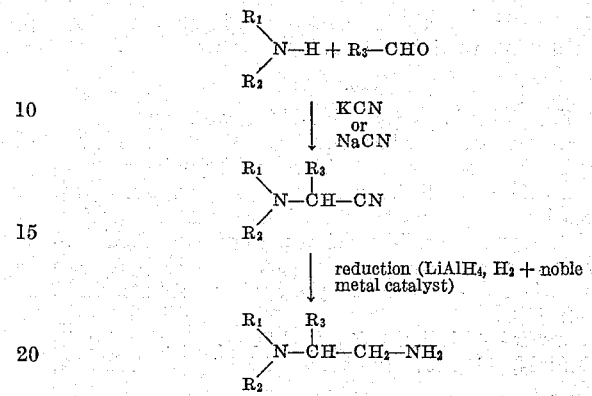

Alternately, the starting materials may be prepared by the following reaction sequence:

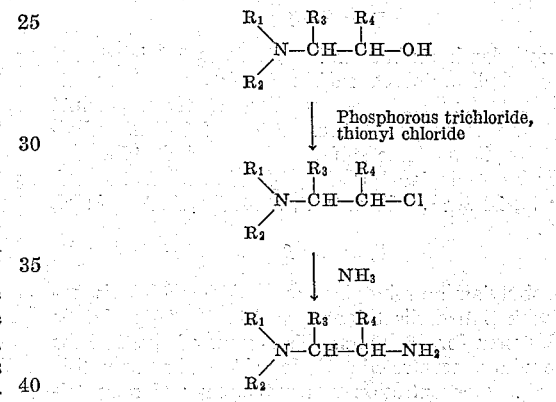

One skilled in the art of chemistry will recognize that there are other possible methods for preparing the aforementioned diamine starting materials.

The S-lower alkyl-isothioureas and the O-lower alkyl-isoureas which are used to convert the diamine to the guanidine are known compounds that are commercially available.

In the reaction sequence depicted hereinabove to prepare the tangible embodiments of this invention the diamine starting material is treated with a reagent capable of converting the primary amine into a guanidine grouping, such as the S-lower alkyl-isothioureas or O-lower alkyl-isoureas previously mentioned, in the presence of a solvent such as water or a water-miscible solvent such as lower alkanols, for example, methanol, ethanol, isopropanol and the like, or cyclic ethers such as, for example, tetrahydrofuran, p-dioxane and the like. The reaction is carried out at a temperature of from ambient temperature to the boiling point temperature of the solvent, and, if desired, in an atmosphere of an inert gas such as nitrogen.

The tangible embodiments of this invention can, if desired, be converted into their non-toxic pharmaceutically acceptable acid-addition and quaternary ammonium salts by conventional means. Typical acid-addition salts include the hydrochloride, hydrobromide, citrate, citraconate, malate, tartrate, maleate, sulfate, nitrate, phosphate, and the like. Typical quaternary ammonium salts are those formed with such alkyl halides as methyl iodide, ethyl bromide, n-hexyl bromide and the like, and with sulfonic acid derivatives, to form such quaternary derivatives, as the methane sulfonate. Such salts are the full equivalents of the free bases and are included within the scope of this invention.

The tangible embodiments of this invention either as the free base or in the form of a non-toxic pharmaceutically acceptable acid-addition or quaternary ammonium salt, may be combined with conventional diluents and carriers, to form dosage forms such as tablets, capsules, solutions, suspensions, suppositories and the like.

The best mode contemplated by the inventor of carrying out this invention will now be set forth as follows:

Example 1

1-dimethylaminopropylamine-2 (51 g., 0.5 mole) and S-methylisothiourea sulfate (69.5 g., 0.25 mole) are mixed together in 500 ml. water. The resulting mixture is refluxed 4 hours with the evolution of methyl mercaptan. The solution is then concentrated under vacuum yielding a white crystalline solid which is purified by recrystallization from ethanol-water to yield 58.0 g. (47%) of 1-(2-dimethylamino-1-methylethyl)guanidine sulfate, M.P. 243–245° C.

*Analysis.*—Calculated ($C_6H_{18}N_4SO_4$): C, 29.74%; H, 7.49%; N, 23.12%. Found: C, 29.5%; H, 7.4%; N, 23.0%.

The following examples illustrate the preparation of other tangible embodiments of this invention:

Example 2

2-dimethylamino-n-butylamine (0.019 mole) is reacted with S-methylisothiourea sulfate (0.0095 mole) as described in Example 1. Recrystallization of the product from ethanol-ether yield 2.1 g. (43%) of 1-(2-dimethylamino-n-butyl)guanidine sulfate, M.P. 282° C. (dec.).

*Analysis.*—Calculated ($C_7H_{20}N_4SO_4$): C, 32.83%; H, 7.86%; N, 21.86%. Found: C, 32.43%; H, 8.04%; N, 21.68%.

Example 3

2-diisobutylamino-n-butylamine (0.300 mole) is refluxed with S-methylisothiourea sulfate (0.150 mole) in 500 ml. water for 16 hours. Treatment of the 2 phase mixture with concentrated sulfuric acid results in solution of the oil. Concentration under vacuum and recrystallization of the residue yields 31.7 g. (31%) of 1-(2-diisobutylamino-n-butyl)guanidine sulfate, M.P. 140° C.

*Analysis.*—Calculated ($C_{13}H_{32}N_4SO_4$): C, 45.86%; H, 9.48%; S, 9.42%. Found: C, 45.5%; H, 9.1%; S, 9.7%.

Example 4

2-diethylamino-n-butylamine (56.6 g.) is reacted with 54.5 g. S-methylisothiourea sulfate and the product recovered from the mixture as described in Example 1 to yield 65.0 g. (58%) 1-(2-diethylamino-n-butyl)guanidine sulfate, M.P. 200–202° C.

*Analysis.*—Calculated ($C_9H_{24}N_4SO_4$): C, 38.0%; H, 8.50%; N, 19.71%. Found: 38.75%; H, 8.91%; N, 19.24%.

Example 5

2-cycloheptyl-2-dimethylaminoethylamine (0.146 mole) is reacted with S-methylisothiourea sulfate (0.073 mole) and the product recovered from the mixture as described in Example 1 to yield 39 g. (82%) of 1-(2-cycloheptyl-2-dimethylaminoethyl)guanidine sulfate, M.P. 245–246° C.

*Analysis.*—Calculated ($C_{11}H_{28}N_4SO_4$): C, 44.42%; H, 8.70%; S, 17.27%. Found: C, 44.2%; H, 8.8%; S, 17.1%.

Example 6

2-cyclohexyl-2-dimethylaminoethylamine (50 g.) is reacted with S-methylisothiourea sulfate (42.3 g.) and the product recovered from the mixture as described in Example 1 to yield 65 g. (67%) of 1-(2-cyclohexyl-2-dimethylaminoethyl)guanidine sulfate, M.P. 262–263° C.

*Analysis.*—Calculated ($C_{11}H_{26}N_4SO_4 \cdot H_2O$): C, 40.23%; H, 8.59%; N, 17.6. Found: C, 40.0%; H, 7.99%; N, 17.08%.

Example 7

2-dimethylamino-n-octylamine (0.191 mole) is reacted with S-methylisothiourea sulfate (0.145 mole) and the product recovered from the mixture as described in Example 1 to yield 70.5 g. (77%) of 1-(2-dimethylamino-n-octyl)guanidine sulfate, M.P. 238–240° C.

*Analysis.*—Calculated ($C_{11}H_{28}N_4SO_4$): C, 42.29%; H, 9.04%; N, 17.93%. Found: C, 42.0%; H, 8.8%; N, 17.8%.

The subject matter which the applicant regards as his invention is particularly pointed out and distinctly claimed as follows:

I claim:
1. A compound of the formula

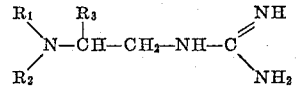

wherein $R_1$ and $R_2$ are lower alkyl and $R_3$ is cycloalkyl having 4 to 10 carbon atoms.

2. 1-(2-cycloheptyl-2-dimethylaminoethyl)guanidine.
3. 1-(2-cyclohexyl-2-dimethylamino-ethyl)guanidine.

References Cited by the Examiner

Brown, J. Chemical Education, vol. 8, pp. 2175–2187 (1931).

Hull, J. Chem. Soc. (London), vol. of 1947, pp. 41–52.

Lespagnol et al., Bull. Soc. Chim. France, 5th Series, vol. 27, pp. 383–9 (1960).

Rubinshtein et al., C.A., vol. 39, p. 22919 (1945).

CHARLES B. PARKER, *Primary Examiner.*